United States Patent
Dawson et al.

(10) Patent No.: US 7,899,189 B2
(45) Date of Patent: Mar. 1, 2011

(54) APPARATUS, SYSTEM, AND METHOD FOR TRANSPARENT END-TO-END SECURITY OF STORAGE DATA IN A CLIENT-SERVER ENVIRONMENT

(75) Inventors: Colin Scott Dawson, Tucson, AZ (US); Kenneth Eugene Hannigan, Tucson, AZ (US); Glen Hattrup, Tucson, AZ (US); Avishai Haim Hochberg, San Jose, CA (US); Donald Warren, Tucson, AZ (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 11/008,403

(22) Filed: Dec. 9, 2004

(65) Prior Publication Data

US 2006/0126850 A1    Jun. 15, 2006

(51) Int. Cl.
   *H04K 1/00*       (2006.01)
(52) U.S. Cl. .................... 380/284; 380/255; 713/150
(58) Field of Classification Search ............ 713/150, 713/153, 164–171; 380/200, 210, 223, 226, 380/255, 259, 277–279, 281–286; 705/50, 705/64, 71
   See application file for complete search history.

(56) References Cited

U.S. PATENT DOCUMENTS

| | | | |
|---|---|---|---|
| 5,301,247 A * | 4/1994 | Rasmussen et al. | 380/43 |
| 5,319,705 A * | 6/1994 | Halter et al. | 705/54 |
| 5,412,722 A | 5/1995 | Sherly et al. | 380/21 |
| 5,719,938 A * | 2/1998 | Haas et al. | 705/52 |
| 5,940,507 A | 8/1999 | Cane et al. | |
| 5,995,623 A * | 11/1999 | Kawano et al. | 713/189 |
| 6,134,660 A * | 10/2000 | Boneh et al. | 713/193 |

(Continued)

FOREIGN PATENT DOCUMENTS

WO    2004086166 A2    10/2004

OTHER PUBLICATIONS

Menezes, et al. "Handbook of Applied Cryptography," 1997, CRC Press, LLC,, pp. 515-516.*

(Continued)

*Primary Examiner*—Kimyen Vu
*Assistant Examiner*—Darren Schwartz
(74) *Attorney, Agent, or Firm*—Kunzler Needham Massey & Thorpe

(57) ABSTRACT

The present invention includes one or more clients in communication with a server. The client desires to send a storage construct to the server for storage. The client negotiates a transmission key with the server. The client generates a storage key associated specifically with the storage construct. The client encrypts the storage construct using the storage key and encrypts the storage key using the transmission key. The encrypted storage construct and encrypted storage key are sent to the server. The server decrypts the storage key using the transmission key. The server stores the storage construct on a storage device separate from a storage device storing the storage key. Preferably, any changes to the storage construct location, the storage key location, or the storage construct name are tracked and proper modifications are made to an association relating the location of the storage construct and the location for the corresponding storage key.

22 Claims, 6 Drawing Sheets

U.S. PATENT DOCUMENTS

| | | | |
|---|---|---|---|
| 6,182,214 B1* | 1/2001 | Hardjono | 713/163 |
| 6,195,432 B1* | 2/2001 | Takahashi et al. | 380/277 |
| 6,286,098 B1 | 9/2001 | Wenig et al. | 713/151 |
| 6,367,019 B1* | 4/2002 | Ansell et al. | 726/26 |
| 6,711,264 B1 | 3/2004 | Matsumoto et al. | 380/283 |
| 6,834,346 B1* | 12/2004 | Ishibashi et al. | 713/179 |
| 2001/0042046 A1* | 11/2001 | Fukuda | 705/51 |
| 2002/0016912 A1 | 2/2002 | Johnson | 713/165 |
| 2002/0071562 A1 | 6/2002 | Parenty | 380/278 |
| 2002/0083346 A1* | 6/2002 | Rowlands | 713/201 |
| 2003/0021417 A1* | 1/2003 | Vasic et al. | 380/277 |
| 2003/0084290 A1 | 5/2003 | Murty et al. | 713/168 |
| 2003/0154390 A1 | 8/2003 | Yamauchi et al. | 713/193 |
| 2003/0210791 A1* | 11/2003 | Binder | 380/277 |
| 2006/0005048 A1* | 1/2006 | Osaki et al. | 713/193 |
| 2006/0173787 A1* | 8/2006 | Weber et al. | 705/59 |
| 2006/0179489 A1* | 8/2006 | Mas Ribes | 726/27 |

OTHER PUBLICATIONS

Le A. et al. "Enhanced Export Control of Cryptographic Keys via a Control Vector", IBMTDBS#AAA92A060945,TDB n11 04-92 p. 41-44.

"Quick Start, TSM Architecture", Tivoli pp. 1-3, http://webdocs.caspur.it/ibm/tsm-5.1.5/mvs/html/qstart/anrmqs14.htm.

* cited by examiner

500

| Key | Const. Name | Const. Loc. | Key Loc. | Key Size | Encrypt Alg. | Last Modified |
|---|---|---|---|---|---|---|
| ~~~ | Mydoc.txt | <Path> | <Path> | 56-bit | DES | <timestamp> |
| ~~~ | Report.txt | <Path> | "04B7..." | 56-bit | DES | <timestamp> |
| ~~~ | App.exe | <Path> | <Path> | 128-bit | AES | <timestamp> |
| . | . | . | . | . | . | . |
| . | . | . | . | . | . | . |
| . | . | . | . | . | . | . |

Fig. 5

APPARATUS, SYSTEM, AND METHOD FOR TRANSPARENT END-TO-END SECURITY OF STORAGE DATA IN A CLIENT-SERVER ENVIRONMENT

BACKGROUND OF THE INVENTION

1. Field of the Invention

The invention relates to data storage and data storage management systems. Specifically, the invention relates to apparatus, systems, and methods for transparent end-to-end security of storage data in a client-server environment.

2. Description of the Related Art

Management and protection of data is of vital importance to business and government interests, for many reasons, including achieving a competitive advantage, compliance with local laws and regulations, and to allay privacy concerns to name a few.

Data has a life cycle that begins when the data is generated and ends when the data becomes obsolete and of no value. As data progresses along this life cycle spectrum, the data is afforded different levels of protection from unauthorized use. Generally, "live" data, data that is newly created or currently in use, is protected using conventional security techniques such as encryption and storage of data in physically secure facilities.

As data ages access frequency may decrease while its value may increase or decrease. Typically, such data is archived or backed up to accommodate new live data on primary storage devices such as memory and Direct Access Storage Devices (DASD). This migration path moves the data from primary storage devices to secondary storage such as removable media including tapes, optical storage, and the like.

Unfortunately, archived data which is generally data that is retained for a predetermined period of time, and backup data which is data stored to allow for data recovery in the event of system failure, are not afforded the same levels of security and protection from unauthorized use as live data. Factors accounting for this generally include the overhead required to provide protection such as encryption including generation and management of encryption keys, the lower priority of archive data and backup data, the shear size of the data involved in backup and archival, and the like. Instead, conventional security measures such as firewalls, safes, locked doors, and guarded and/or locked facilities are relied upon.

It is desirable that backup data and archive data be secure both in transit and once stored on a storage medium. In particular, it is desirable that the backup data and archive data be protected between a client and a server communicating over a network. One challenge faced in encrypting backup data and archive data is the issue of encryption key management. An entity may require access to backup data and archive data for many months or years into the future. The encryption keys must be carefully managed because loss of the keys through mismanagement or equipment failure can effectively render large quantities of backup data and archive data useless. Entrusting encryption key management to a user is highly error prone due to human memory limits and turn over in an entity. Managing keys using applications that originally produced or used the data adds significant overhead to the application, is inconsistent between applications, and may not be practical given the life of the backup data and archive data may extend beyond that of the application.

Current storage and backup systems that include encryption are inadequate. Such systems generally store the encryption keys with the encrypted data on the same storage device or medium. Unauthorized access to the storage device or medium results in loss of protection for the data. Other conventional systems use a single key associated with the storage device, volume, or media that operates to decrypt all files on the same storage device, volume, or media. Consequently, compromise of the key provides access to all the files. Certain conventional systems do not automatically handle migration of backup data and archive data from one storage device or media to another. Consequently, matching an encryption key with the proper encrypted file can be difficult or impossible. Still other conventional systems apply a single level of protection regardless of the type of backup data or archive data involved. Consequently, computing resources may be wasted protecting data that does not require this default level of protection.

From the foregoing discussion, it should be apparent that a need exists for an apparatus, system, and method for transparent end-to-end security of storage data in a client-server environment. Beneficially, such an apparatus, system, and method would encrypt backup and archive data in transit and on storage and would encrypt the encryption key associated with the backup data and archive data in transit. In addition, the apparatus, system, and method would allow clients to generate keys of a suitable security level that are associated with individual files owned by a host of the client on a one-to-one basis rather than a one-to-many basis. Furthermore, the apparatus, system, and method would store encryption keys separate from the encrypted data and manage changes in the location of the keys and/or the encrypted data over the entire life of the encrypted data.

SUMMARY OF THE INVENTION

The present invention has been developed in response to the present state of the art, and in particular, in response to the problems and needs in the art that have not yet been met for transparent end-to-end security of storage data in a client-server environment. Accordingly, the present invention has been developed to provide an apparatus, system, and method for transparent end-to-end security of storage data in a client-server environment that overcomes many or all of the above-discussed shortcomings in the art.

An apparatus according to the present invention includes a key generator, an encryption module, and a communication interface. The key generator generates a random storage key for each storage construct associated with a storage session. The storage key is preferably uniquely associated with the storage construct. Those of skill in the art will recognize that the terms "storage key," "transmission key," and "native key" are used for clarity and convenience. The terms "storage key," "transmission key," and "native key" refer to distinct encryption keys used in the context of the present invention and do not necessarily refer to particular terms of art.

A storage construct comprises any data structure configured for storage and management of storage data by a storage server. In certain embodiments, the storage construct comprises a software structure such as an object, an array, a list, an application-specific object, a serialized object, a file, a volume, a database data object, a record, a table, a table space, or the like. In one embodiment, the storage construct may comprise a file within a file system of the sender.

The encryption module encrypts the storage construct using the storage key and encrypts the storage key preferably using a symmetric transmission key known to a receiver. Alternatively, the transmission key may comprise a pair of asymmetric keys. The encrypted storage construct and the encrypted storage key may include an indicator of the encryption algorithm used. The encryption algorithm used for encrypting the storage key may be different or the same as the encryption algorithm used for the storage construct. The communication interface transmits the encrypted storage construct and the encrypted storage key to the receiver.

The receiver stores the encrypted storage construct on a first storage device, decrypts the encrypted storage key using the transmission key, and stores the storage key on a second storage device physically distinct from the first storage device. Optionally, the receiver encrypts the storage key using a native key known only to the receiver and then stores the re-encrypted storage key on the second storage device.

The apparatus in certain embodiments may include an association module, a configuration module, and a negotiation module. The association module manages an association between the encrypted storage construct on the first storage device and the encrypted storage key on the second storage device. The association may include a storage key location and a storage construct location. The association module may modify the association in response to relocation of at least one of the storage key and the encrypted storage construct. The association module may reside within a sender of the storage key and the encrypted storage construct or the receiver and may comprise a relational database. The configuration module may define a symmetric transmission key for use by the sender and the receiver. Alternatively, or in addition, the negotiation module negotiates the transmission key between the sender and the receiver.

The receiver may include certain components different from those of the sender such as a security module configured to decrypt the storage key using the transmission key. The security module may re-encrypt the storage key using a native key, such that the storage key stored by the storage module is a re-encrypted storage key. The receiver may comprise a communication interface configured to receive an encrypted storage construct and an encrypted storage key from a sender. Optionally, the storage construct may have been encrypted using the transmission key shared with the sender.

A storage module of the receiver may store the encrypted storage construct on a first storage device and the storage key on a second storage device physically distinct from the first storage device. Alternatively, the first storage device and second storage device may be logically distinct. The receiver may comprise a storage server and the sender may comprise one of a data storage clients. More particularly, the sender may comprise one of a plurality of backup-archive clients.

A signal bearing medium of the present invention is also presented including machine-readable instructions configured to perform operations for transparent end-to-end security of storage data in a client-server environment. In one embodiment, the operations include an operation to generate a unique storage key for a specific storage construct. Another operation encrypts the storage construct using the storage key. Other operations may encrypt the storage key using a transmission key known to a sender and a receiver, transmit the encrypted storage construct and the encrypted storage key from the sender to the receiver, and decrypt the storage key using the transmission key. Finally, an operation is executed to store the encrypted storage construct on a first storage device and the decrypted storage key on a second storage device physically distinct from the first storage device.

In certain embodiments, the machine-readable instructions include an operation to negotiate the transmission key between the sender and the receiver. In addition, the machine-readable instructions may include an operation to modify an association that comprises a storage key location and a storage construct location in response to changing the location of at least one of the storage key and the encrypted storage construct. In one embodiment, at least one of a key size and an encryption algorithm is determined based on a security policy associated with the storage construct. The storage construct may comprise a file within a file system of the sender. The storage key may be generated and based at least in part on data associated with the storage construct such as the construct name, creation date, internal file data, or the like. At least one of the first storage device and the second storage device may comprise a removable computer-readable medium.

The present invention also includes embodiments arranged as a system, method, and computing infrastructure that comprise substantially the same functionality as the components and steps described above in relation to the apparatuses and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a schematic block diagram illustrating a data structure suitable for maintaining an association according to one embodiment of the present invention.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of select embodiments of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
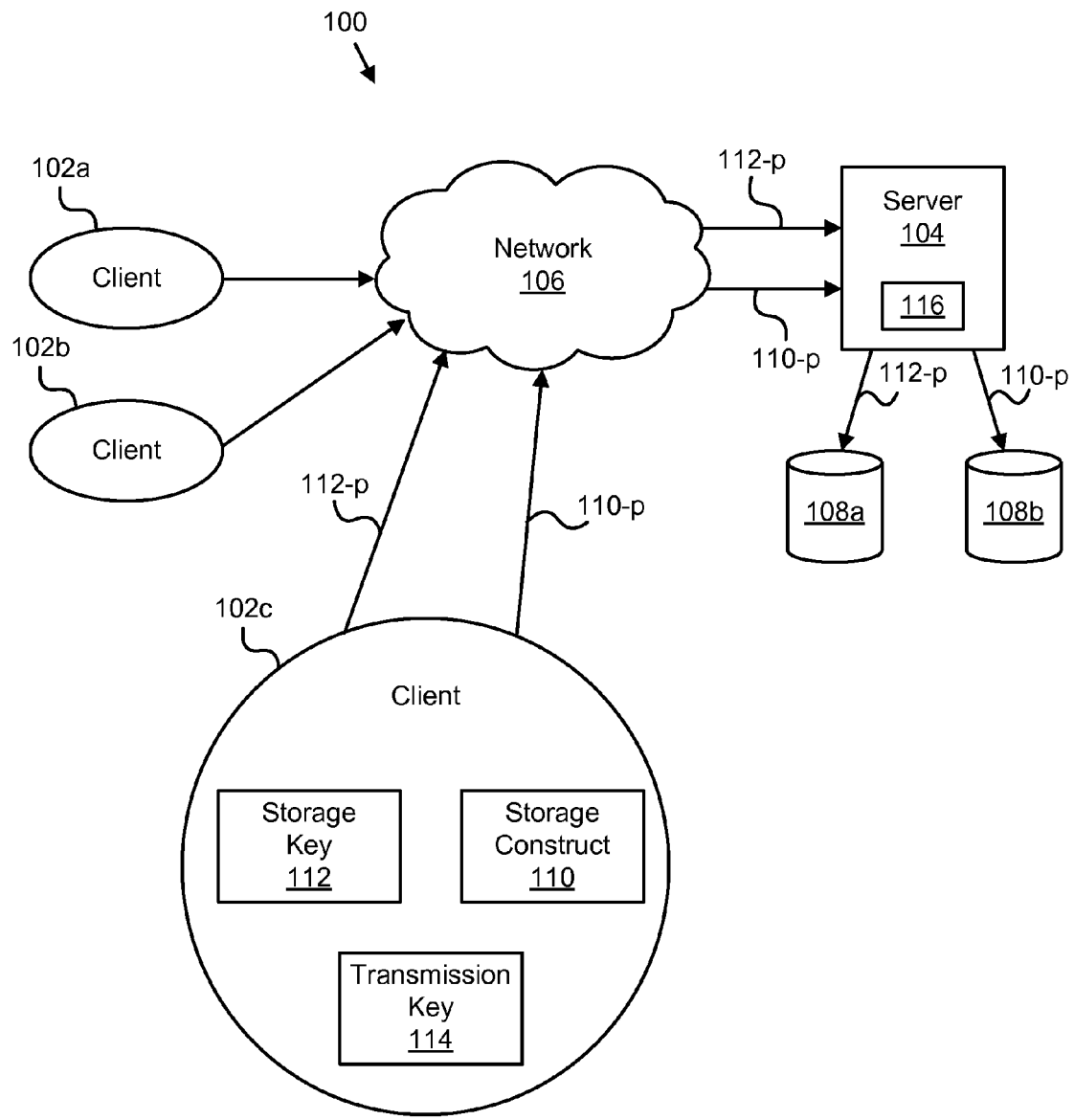
FIG. 1 is a block diagram illustrating a system for transparent end-to-end security of storage data in a client-server environment in accordance to one embodiment of the present invention.

FIG. 1 illustrates a system 100 suitable for transparent end-to-end security of storage data in a client-server environment. In one embodiment, the system 100 comprises a storage management system organized using a client-server architecture. Examples of storage management systems suitable for use with the present invention include a Tivoli® Storage Manager (TSM®) available from IBM, a Net Backup available from Veritas, Networker available from Legato, and the like. The system 100 includes a plurality of clients 102a-c, also known as backup-archive clients 102a-c, and one or more servers 104, commonly referred to as storage servers, connected by a network 106.

The clients 102a-c permit applications running on computer systems such as workstations to designate data files to be backed up and/or archived. The client 102a-c handles transmission and storage of the backup and archive data files on storage devices 108a-b. Preferably, the storage devices 108a-b are physically distinct and owned and maintained by the server 104. Alternatively, the storage devices 108a-b are shared and may be connected via a Storage Area Network (SAN).

Typically, the files designated to be backed up and/or archived are referred to herein as storage constructs 110. The storage constructs 110 may comprise any format of persistent storage data. In one embodiment, each storage construct 110 may correspond to a file within a file system of the computer system executing the client 102c. Alternatively, a plurality of storage constructs 110 may be bundled by the client 102c into a single backup file and/or archive file.

In preparation to send the storage construct 110 to the server 104, the client 102c may automatically determine based on a security policy associated with the storage construct 110, that the storage construct 110 should be encrypted. Alternatively, the security policy may indicate that encryption is not required for the storage construct 110. If the storage construct 110 is to be encrypted, the client 102c generates a storage key 112. Preferably, the storage key 112 is randomly generated. Alternatively, the storage key 112 may be generated based on a predefined sequence or protocol.

The client 102c uses the storage key 112 and one of a plurality of encryption algorithms to encrypt the storage construct 110. The encryption protects the storage construct 110 in transit and while the storage construct 110 resides on one of the storage devices 108a-b. In one embodiment, the storage key 112 comprises a symmetric key. A symmetric key is an encryption key configured such that the same key or an exact duplicate must be used both to encrypt and decrypt data.

In one embodiment, the storage key 112 is transmitted to the server 104. To further protect the storage construct 110, the storage key 112 is also encrypted with one of a plurality of encryption algorithms and a transmission key 114. The transmission key 114 is a key that is shared by both the client 102c and the server 104. Preferably, the server 104 shares the transmission key 114 exclusively with a specific client 102c. In one embodiment, the transmission key 114 is predefined on both the client 102c and the server 104. In another embodiment, the client 102c and the server 104 negotiate to determine the transmission key 114. Preferably, the transmission key 114 is also a symmetric key. Alternatively, the client 102c and server 104 may support asymmetric encryption algorithms such as algorithms that support a Public Key Interface (PKI). In such embodiments, the transmission key 114 may comprise corresponding keys from a pair of keys used to encrypt and decrypt the storage key 112.

A client 102c communicates with the server 104 to authorize storage of the storage construct 110 on the storage devices 108a-b. Typically, the client 102c uses conventional request and response messaging to prepare the server 104 to receive the storage construct 110. Once the client 102c receives authorization from the server 104, the client 102c transmits the encrypted storage construct 110 (illustrated by path 110-p) and the encrypted storage key 112 (illustrated by path 112-p) to the server 104.

The server 104 receives the encrypted storage construct 110 and the encrypted storage key 112. The server 104 decrypts the encrypted storage key 112 using the transmission key 114. Optionally, if the transmission key 114 is retained and available to the client 102c, the server 104 may not decrypt the storage key 112 and may instead simply store and return the storage key 112 to the client 102c when requested.

Preferably, client 102c and server 104 support a plurality of encryption algorithms including the Data Encryption Standard (DES), the Advanced Encryption Standard (AES), and other symmetric encryption algorithms. Consequently, the encrypted storage key 112 and/or the encrypted storage construct 110 may include an indicator such as a header that identifies which encryption algorithm was used to encrypt the storage key 112 and/or storage construct 110. Alternatively, the client 102c and the server 104 may agree on the encryption algorithm when communication is initially established. In another embodiment, the encryption algorithm used to encrypt the storage construct 110 may not be provided to the server 104.

Preferably, the server 104 stores the decrypted storage key 112 on a first storage device 108a and the encrypted storage construct 110 on a second storage device 108b. Advantageously, the server 104 tracks where the storage construct 110 and its associated storage key 112 are stored. This operation is described in more detail below in relation to the association between a storage construct 110 and its storage key 112.

The storage construct 110 is preferably retained in an encrypted state such that unauthorized access to the second storage device 108b does not compromise the security of the storage construct 110. In one embodiment, the storage key 112 is stored in an encrypted format. For example, the server 104 may generate a native key, discussed in more detail below. The server 104 may re-encrypt the storage key 112 using the native key. Consequently, the re-encrypted storage key 112 may then be stored on the first storage device 102a.

Storing the storage key 112 separate from the storage construct 110 provides added security. If the storage device 108b holding the storage construct 110 is stolen or otherwise exposed to unauthorized access, the storage construct 110 remains protected because the storage key 112 is not on the same device 108b. However, to preserve the utility of the encrypted storage construct 110 the client 102c should be able to access the storage key 112 associated with an encrypted storage construct 110 when needed. Consequently, the server 104 maintains an association 116 between a location of the storage key 112 and a location of the storage construct 110.

Those of skill in the art will readily recognize that the client 102c can retrieve the storage construct 110 and associated storage key 112 when needed by sending a request to the server 104. The server 104, in response, may reference the association 116 to locate the storage construct 110 and storage key 112. The server 104 may also encrypt the storage key 112 once again with a transmission key 114. The client 102c decrypts the storage key 112 using the transmission key 114 and decrypts the storage construct 110 using the decrypted storage key 112.

Figure 2:
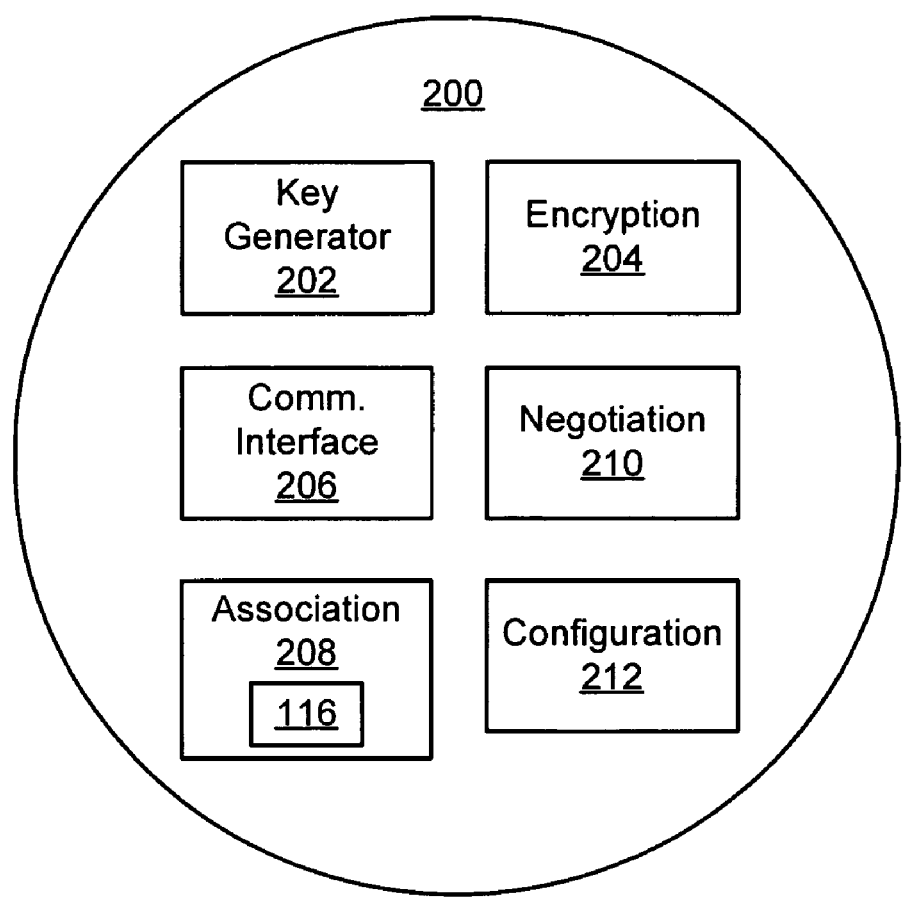
FIG. 2 is a logical block diagram illustrating one embodiment of an apparatus for transparent end-to-end security of storage data in a client-server environment in accordance with the present invention.

Referring now to FIG. 2, an apparatus 200 suitable for transparent end-to-end security of storage data in a client-server environment. In one embodiment, the apparatus 200 serves as the client 102c described above in relation to FIG. 1. Alternatively, the apparatus 200 may operate in a peer-to-peer architecture.

The apparatus 200 may include a key generator 202, an encryption module 204, and a communication interface 206. The key generator 202 generates encryption keys as needed. In particular, the key generator 202 may generate a random storage key 112 (See FIG. 1). Preferably, the storage key 112 corresponds to a single storage construct 110 (See FIG. 1).

The size of the storage key 112 may be varied by the apparatus 200. In certain embodiments, the apparatus 200 determines the size of the storage key 112 based on local storage policies. The local storage policies may dictate different levels of encryption for certain types of files or files of a particular age. In this manner, the apparatus 200 controls the level of encryption applied to the files. Consequently, the overhead incurred by encryption is limited to just the files of a sensitive nature that require the protection. Encryption levels may be controlled by altering the encryption storage key 112 length and/or the type of encryption algorithm used.

In certain embodiments, a specific storage key 112 is generated for each distinct file of a file system that is included in a storage session. A storage session typically comprises a batch of one or more storage constructs 110 that are to be stored or backed up using a common set of attributes. The storage session may be defined manually by a user or automatically in response to storage requirements on the apparatus 200.

The encryption module 204 encrypts each storage construct 110 using the storage key 112 generated specifically for that storage construct 110. The encryption module 204 also encrypts the storage key 112 with the transmission key 114. Preferably, the encryption module 204 serves both to encrypt and decrypt a storage construct 110 and/or storage key 112. Alternatively, a separate decryption module may be provided. The encryption module 204 preferably support a variety of symmetric encryption algorithms including DES, 3-DES, AES, and the like.

One benefit of supporting symmetric encryption algorithms is that the apparatus 200 can generate a storage key 112 of suitable length and in a random manner, if needed. Origination of an encryption key at the apparatus 200 provides another level of security as the storage key 112 is transferred a minimum number of times. In addition, capture of one storage key 112 only compromises a single storage construct 110. Other storage constructs 110 have different storage keys 112 in one embodiment, therefore, these storage constructs 110 are highly secure.

In one embodiment, the encryption module 204 determines a proper level of security for the storage construct 110. Typically, the longer the encryption key the stronger the encryption protection. The encryption module 204 may determine a security level for the storage construct 110 according to its own local security policies. Alternatively, a user or owner of the storage construct 110 may designate a security level using for example a parameter.

The communication interface 206 comprises sufficient logic and hardware to enable communication via conventional network communications. In addition, the communication interface 206 transmits the encrypted storage construct 110 and encrypted storage key 112. Preferably, the communication interface 206 includes or is compatible with conventional networking protocols such as Transmission Control Protocol, Internet Protocol (TCP/IP). In certain embodiments, the communication interface 206 may designate a first storage device 108a for the encrypted storage construct 110 and a second storage device 108b for the storage key 112.

Optionally, the apparatus 200 may also include an association module 208, a negotiation module 210, and a configuration module 212. The association module 208 serves to manage an association 116 between each storage key 112 and the corresponding storage construct 110. Typically, the association 116 comprises a mapping between the physical location of the storage key 112 and the physical location of the storage construct 110. The association module 208 generates, destroys, and modifies associations 116 as needed. The association module 208 may reside in the client 102c or in the server 104. Preferably, the association 116 is stored and maintained either locally or remotely by the association module 208. In this manner, the physical protections of the server 104, data preservation features and other enterprise data protection mechanisms also protect the association 208.

The association 116 may be represented using a variety of data structures including a table, an array, a linked list, an object, or the like. In addition to a location for the storage construct 110 and a location for the storage key 112, the association 116 may include other information such as names of files, timestamps, or in some cases the actual storage key 112 for example.

The negotiation module 210 enables the apparatus 200 to interact with a receiver such as a server 104 to determine the transmission key 114. Those of skill in the art will recognize a variety of protocols that may be used to negotiate a transmission key 114. In one embodiment, the apparatus 200 and the receiver both communicate using the strongest encryption level and/or encryption algorithm each supports. The least common denominator may then be selected as the encryption level and/or encryption algorithm.

In one example, the apparatus 200 and the receiver may be preconfigured to establish a transmission key 114 according to the following protocol. The apparatus 200 may randomly generate the first half of the transmission key 114 and the receiver the other half. The apparatus 200 and receiver may then communicate the respective halves in plain text. Once received by the other party, each side concatenates the half received with the half generated to establish the transmission key 114. Exactly, which half becomes the first half and which half becomes the second half may be predetermined for the apparatus 200 and the receiver. In this manner, the transmission key 114 may not be transmitted completely in plain text but each party remains flexible enough to use a randomly generated transmission key 114 without user intervention. In addition, the transmission key 114 may be changed frequently to further protect the data encrypted using the transmission key 114.

In an alternative embodiment, rather than use a negotiation module 210 to determine the transmission key 114, a configuration module 212 may be used. The configuration module 212 may serve to permit a user to configure a variety of options regarding the apparatus 200. Alternatively, the configuration module 212 may serve exclusively for defining a symmetric transmission key 114. For example, a user interface of the configuration module 212 may permit a user to type in the transmission key 114. In certain embodiments, a similar configuration module 212 may reside on the receiver of the storage constructs 110. Consequently, a user may define the transmission key 114 randomly, or based on a routine, and then enter the same, identical transmission key 114 into both the apparatus 200, using the configuration module 212, and the receiver. In this manner, the transmission key 114 is never exposed to compromise in transit between the apparatus 200 and the receiver. However, there is a certain administrative burden as an administrator must set the transmission key 114 at least once on both the apparatus 200 and the receiver.

Figure 3:
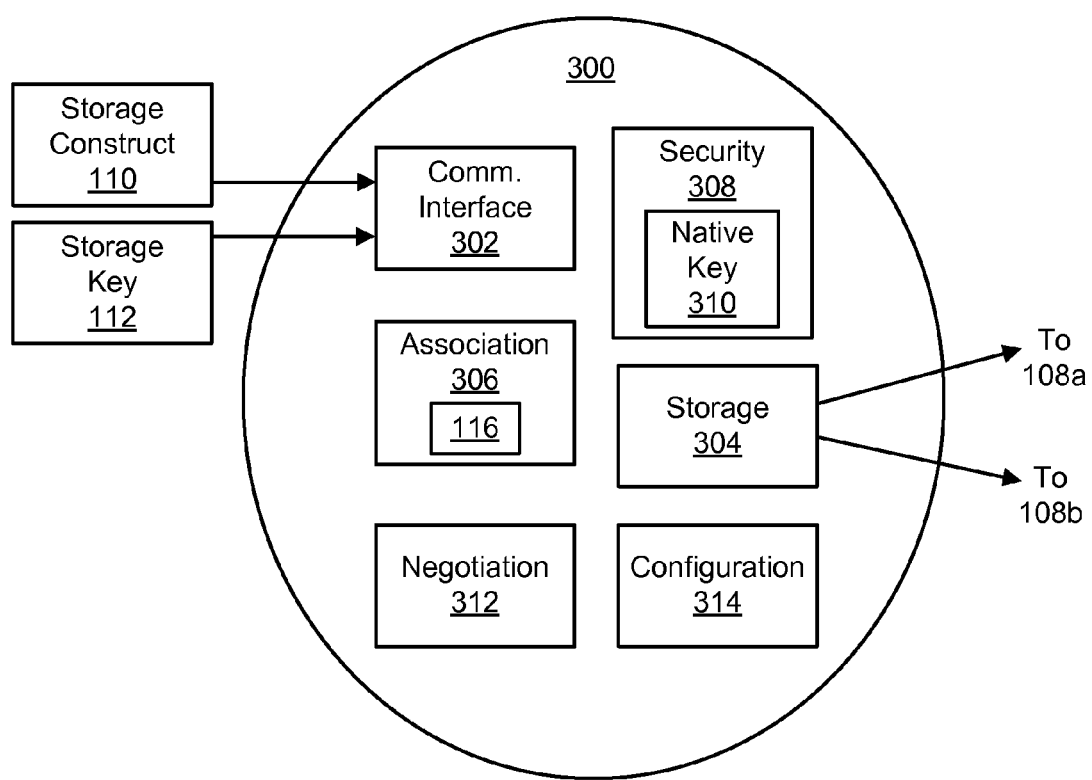
FIG. 3 is a logical block diagram illustrating an alternative embodiment of an apparatus for transparent end-to-end security of storage data in a client-server environment in accordance with the present invention.

FIG. 3 illustrates an alternative embodiment of an apparatus 300 for transparent end-to-end security of storage data in a client-server environment. In one embodiment, the apparatus 300 serves as the server 104 described above in relation to FIG. 1. Alternatively, the apparatus 300 may operate in a peer-to-peer architecture. Preferably, the apparatus 300 is in operative communication with one or more clients 102a-c and/or peers.

The apparatus 300 may include a communication interface 302, a storage module 304, and an association module 306. The communication interface 302 is configured to receive an encrypted storage construct 110 and an encrypted storage key 112. The storage module 304 stores the encrypted storage construct 110 on a first storage device 108b and the storage key 112 on a second storage device 108a.

Preferably, the storage key 112 is received by the communication interface 302 in an encrypted form. For example, a sender, such as a client 102c, may encrypt the storage key 112 using a transmission key 114 known to the apparatus 300. Consequently, the apparatus 300 employs a security module 308 to decrypt the encrypted storage key 112.

The security module 308 may decrypt the storage key 112 shortly after receiving it. In this manner, each transmission key 114 may exist for a very short period of time. Once the storage key 112 has been decrypted, the transmission key 114 has served its purpose and is no longer needed. In one embodiment, the apparatus 300 is configured to use a separate transmission key 114 for each storage key 112 received. Alternatively, a single transmission key 114 may be used for a batch of storage keys 112. The communication interface 302 may negotiate the life span and one-to-one or one-to-many relationship of transmission keys 114 when communication is first established between the apparatus 300 and the sender.

The security module 308 serves a purpose similar to the encryption module 204 discussed above. In particular, the security module 308 is configured to encrypt or decrypt as needed using a variety of encryption algorithms. Preferably, the encryption algorithms are symmetric encryption algorithms. In one embodiment, the security module 308 accepts an input message, a key, an indicator for an encryption or decryption operation, and optionally an identifier of the encryption algorithm. The output is the encrypted or decrypted form of the input message.

In one embodiment, the security module 308 decrypts the storage key 112 using the transmission key 114. Preferably, the transmission key 114 is a symmetric encryption key. The storage module 304 may then store the decrypted storage key 112 on the second storage device 108a.

Optionally, the security module 308 may decrypt the storage key 112 using the transmission key 114 and then encrypt the decrypted storage key 112 using a native key 310. In this manner, the storage key 112 becomes re-encrypted using the native key 310. The storage module 304 may then store the re-encrypted storage key 112 on the second storage device 108a.

In this manner, the storage key 112 is further secured. Preferably, the native key 310 is known exclusively to the apparatus 300 and is optionally a symmetric key. Furthermore, the security module 308 preferably uses a single native key 310 for all re-encrypted storage keys 112. Encrypting the storage keys 112 protects the storage keys 112 from compromise if the second storage device is accessed by unauthorized users.

In certain embodiments, the apparatus 300 includes a negotiation module 312 and a configuration module 314. Those of skill in the art are readily familiar with client-server architectures. Thus, those of skill in the art will understand that certain modules of the client, such as apparatus 200, include corresponding modules in the server, such as apparatus 300. Consequently, negotiation module 312 interacts with a sender, such as a client 102c to determine the transmission key 114. Of course, other elements may be negotiated as well including the communication protocol, the sizes of encryption keys (transmission and/or storage), the encryption algorithm, and the like.

One advantage of a negotiated transmission key 114 is that the client and apparatus 300 can establish a different transmission key 114 for each communication session. In this manner, if a single transmission key 114 is compromised, only a single encrypted storage construct 110 is at risk, presuming the encrypted storage key 112 is also compromised. These multiple layers of security precautions require an unauthorized user to obtain multiple pieces of information in order to obtain access to the storage construct 110. The unauthorized user must also decipher which pieces of information are keys and which are data. In certain embodiments, the sender and the apparatus 300 negotiate to use a different encryption algorithm for the storage key 112 than the algorithm used to encrypt the storage construct 110. The unauthorized user must determine how the keys are related and which encryption algorithms are being used. This may be possible using a brute-force trial and error approach. However, even if successful, only a single storage construct 110 is compromised.

Similarly, a user may use a user interface of the configuration module 314 to manually enter the transmission key 114. The same transmission key 114 is preferably entered using a configuration module 212, 314 in both the sender(s) and the receiver. The same transmission key 114 may be used for both the client(s) 102a-c and the server 104 for all storage keys 112. Alternatively, the transmission key 114 may be renegotiated for each storage key 112 or for storage keys 112 from a particular client 102c.

The communication interface 302 maintains a relationship between the storage construct 110 and the storage key 112 because the storage key 112 is preferably uniquely associated with the storage construct 110. A one-to-one relationship between keys 112 and storage constructs 112 increases the security of each individual file. The association module 306 facilitates the maintenance and management of this relationship using an association 116. In particular, the association module 306 uses the association 116 to track which storage key 112 unencrypts (unlocks) which storage construct 110 as well as the respective locations of the storage keys 112 and storage constructs 110.

In one embodiment, the association module 306 comprises a database management system. In particular, the database management system may include an association 116 implemented as a hierarchical or relational database 116. The database 116 may include multiple tables organized to track various information about a storage key 112 and its associated storage construct 110. As the storage construct 110 preferably is associated with a single storage key 112, the rows of the database tables may correspond to individual files currently being stored by the apparatus 300.

Advantageously, a database management system implementation of the association module 306 provides a clear, well organized system for tracking the many storage constructs 110 and associated storage keys 112. The number of backup and archive storage constructs 110 from a single client 102c can quickly rise to tens of thousands of files that are difficult to manage without a database system. In addition, a database management system implementation of the association module 306 provides a central location for tracking and logging changes to the location of existing storage constructs 110 and the addition of new storage constructs 110. Alternatively, different components of the association module 306 may be distributed between various apparatuses 300 and/or located on the client 102c.

Figure 4:
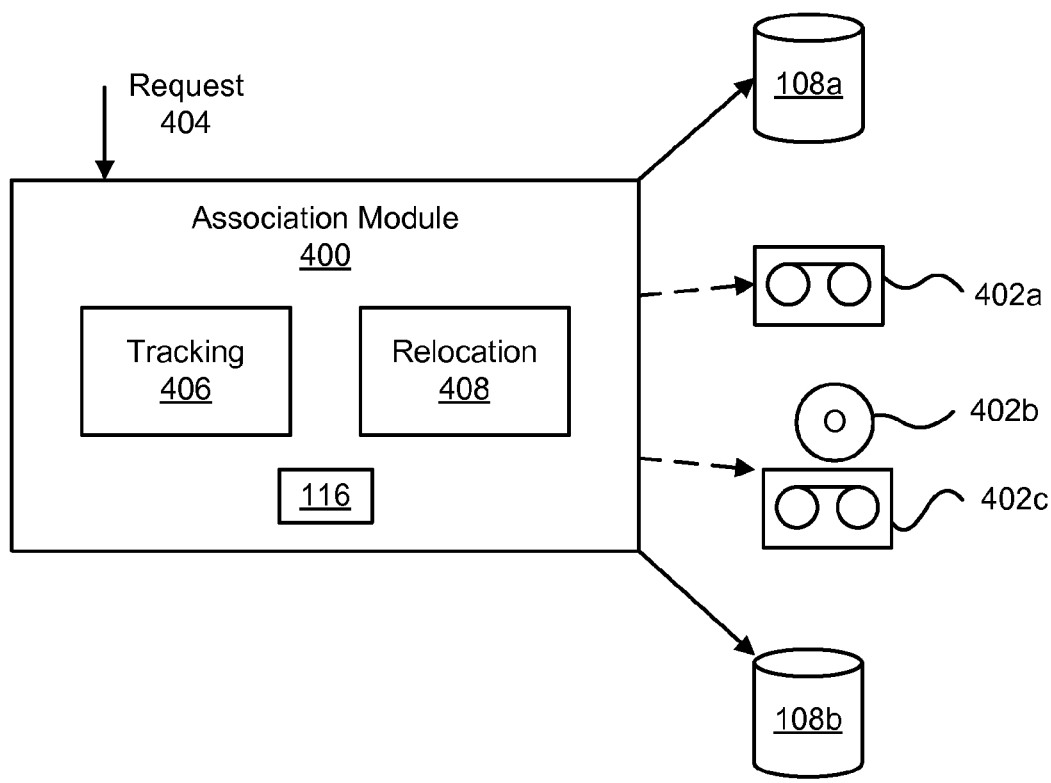
FIG. 4 is a schematic block diagram illustrating one example of an association in accordance with the present invention.

FIG. 4 illustrates one embodiment of an association module 400 in accordance with the present invention. In addition to recording an association 116 between the storage construct 110 and the storage key 112, the association module 400 also manages the association 116 in response to changes in the locations of either the storage construct 110, the storage key 112, or both. Typically, the factors contributing to a storage construct's storage value changes over time. These factors may include availability, security, integrity, backup priority, and the like. In addition, the requirement to retain fast access to a storage construct 110 typically decreases over time. Consequently, storage constructs 110 may be migrated either manually or automatically by a storage management system such as the server 104 from a primary storage device 108b to a secondary storage device 402 (illustrated by storage devices 402a, 402b, and/or 402c). The primary storage device 108b and secondary storage device 402 may comprise various combinations of storage devices available including storage media. For example, the primary storage device 108b may comprise a device that supports direct random access such as a hard drive and the secondary storage device 402 may comprise a tape, CD-ROM, CDRW, DVDR/W, and the like.

Typically, the secondary devices 402 are those that are well suited to long term storage, may be read-only, have higher access times, and may use removable media. The storage constructs 110 may be migrated for various reasons including archival, freeing of space on the storage devices 108a-b, and the like. The levels of migration may vary as well. For example a first level may be a disk drive 108a-b, the second level may be a tape media 402, and a third level may be read-only media such as a CDROM or DVD. The levels of migration may also correspond to different storage systems comprised of both storage logic and storage devices. For example, a first level may comprise a Direct Access Storage Device (DASD) such as an Enterprise Storage Server and the second level may comprise a Virtual Tape Server (VTS).

In one embodiment, all requests 404 to access a storage construct 110 are routed by a computer system that owns the storage devices 108a-b (or storage systems) to the server 104. The server 104 passes the requests 404 to the association module 400. Alternatively, only requests 404 to copy or move storage constructs 110 are routed to the association module 400.

The association module 400 may include a tracking module 406 and relocation module 408. The tracking module 406 in the illustrated embodiment may determine whether the request 404 is for copying or moving of an encrypted storage construct 110. Alternatively, if the request 404 includes exclusively copy and/or move commands, the tracking module 406 determines whether the requested storage construct 110 has been encrypted using an associated storage key 112.

Typically, a request 404 includes a source location, a source file identifier, a destination location, and optionally a destination file identifier. In certain embodiments, the file identifier and location information are incorporated in a single data structure known as a pathname. The determination is made by referencing the association 116 and searching for a matching source file identifier such as the construct name.

Preferably, the association 116 is implemented as a database with an index on the construct names such that this determination is made very quickly.

If the tracking module 406 determines that a request 404 involves an encrypted storage construct 110 having an associated storage key 112, the relocation module 408 may examine the request 404. In one embodiment, the relocation module 408 confirms that the source location is different from the destination location. This confirmation may require the relocation module 408 to parse a source pathname and a destination pathname and then make a comparison.

If the two locations are different, the relocation module 408 permits the requested copy and/or move operation to proceed. The relocation module 408 may perform the copy and/or move operation itself or enlist the assistance of other systems such as a file system and/or an operating system. The relocation module 408 preferably, ensures that the operation was successful. If so, the relocation module 408 atomically updates the information for the particular storage construct 110 in the association 116 such that the location information in the association 116 reflects the change made on the storage devices 108a-b, 402. In this manner, migration of storage constructs 110 does not separate storage keys 112 from the associated storage constructs 110.

Furthermore, the tracking module 406 and relocation module 408 may be used to change location information in the association 116 on a batch level to support movement or copying of multiple storage constructs 110 in a single operation. In addition, the tracking module 406 and relocation module 408 may cooperate to remove information from the association 116 to reflect deletion of encrypted storage constructs 110. For example, if the request 404 is a delete operation, the relocation module 408 may delete one or more rows from tables in the association 116.

Of course those of skill in the art will recognize other management operations that the tracking module 406 and relocation module 408 may cooperate to accomplish. For example, a request may attempt to consolidate encrypted storage constructs 110 and the associated storage keys 112 on a single storage medium 108a-b, 402. The tracking module 406 and relocation module 408 may specifically prevent or allow this operation depending on a configuration setting set for example using a configuration module 212, 314.

Advantageously, tracking of location changes for the storage constructs 110 and/or storage keys 112 and automatic updating of the association 116 relieves a large management burden for a storage system administrator. In this manner, the security of one-to-one relationships between a storage construct 110 and a storage key 112 is provided without the management overhead of manually adjusting association 116 location information when storage constructs 110 and/or storage keys 112 are moved or copied. Furthermore, the location information in the association 116 may be managed regardless of whether the request 404 is manually issued or automatic based on a storage management policy.

FIG. 5 illustrates a representative example of a data structure 500 suitable for implementing the association 116. In one embodiment, the association 116 comprises a single database table. Alternatively, a plurality of tables may be used to implement the association 116. Of course the association 116 may also be implemented using other data structures including lists, linked lists, arrays, objects, stacks, queues, and the like.

The data structure 500 may include columns such as a key 502, a construct name 504, a construct location 506, and a storage key location 508. The purpose of the data structure 500 is to provide quick access to the construct location 506 and the storage key location 508. Consequently, as rows 510 are added, the server 104 may generate a unique key 512. The keys 512 may be indexed such that a row of interest can be quickly retrieved.

The rows are referenced when a client 102c requests a particular storage construct 110. The request may include the key 502 or the construct name 504 and construct location 506. The server 104 provides the encrypted storage construct 110 and the storage key 112 in response to a request for a storage construct 110. The association module 306 references the data structure 500 to identify the storage key location and/or the storage construct location. The server 104 then uses this location information to retrieve the storage key 112 and storage construct 110 from the first storage device 108a and the second storage device 108b.

The client 102c may provide the key 502, the construct name 504 and construct location 506, or key value 514 in order to identify a single row. Alternatively, the construct name 504 and construct location 506 may be combined and stored as a pathname. The construct name 504 identifies the storage construct 110. As the construct names 504 may be duplicated, the key 502 allows each row 510 to be uniquely identified.

The construct location 506 typically comprises a path in a file system that manages the storage device 108b. Alternatively, the construct location 506 comprises another form of an address suitable for locating the storage construct 110 on a storage device 108a. For example, where the storage device 108b is a tape drive, the construct location 506 may comprise a volume identifier and an offset into the tape. Alternatively, the construct location 506 and/or storage key location 508 may comprise a Universal Resource Identifier (URI) such that the storage construct 110 and/or association storage key 112 may be stored on storage devices 108a-b of various networks. Preferably, the storage constructs 110 are stored in a separate location from the storage keys 112.

Similarly, the key location 508 comprises an address for locating the storage key 112. In one embodiment, the key location 508 is a path to a data file in a file system. Alternatively, the key location 508 is an address or other location indicator within a memory device, storage device, removable storage media, database, or the like. In certain embodiments, the data structure 500 comprises the location for the storage keys 112. Consequently, storage key values 514 may be stored directly within the storage key location column 508.

Alternatively, another table in an association database may store the storage key values 514. Storage key values 514 are preferably stored in an American Standard Code for Information Interchange (ASCII) text format but may also be stored in hexadecimal, decimal, binary, or other formats. In FIG. 5, the storage key value 514 is a text representation of hexadecimal data "04B7. . . " Consequently, the storage key value 514 corresponds to a portion of fifty-six bit storage key 112.

The association 116 is formed in one embodiment by storing on a single row identifying information for the storage construct 110, location information for the storage construct 110, and location information for the storage key 508 or the actual storage key 514. The identifying information for the storage construct 110 may include the key 502 and/or the construct name 504 and construct location 506. The association 116 is maintained by updating the construct name 504, construct location 506, and key location 508 or key value 514 as necessary. The association 116 is removed by deleting the appropriate row 510.

Other columns may be included in the data structure 500 or passed as arguments in messages between the client 102c and the server 104 as needed. These columns are readily recognized to those of skill in the art and may include more or fewer columns than those illustrated. Optional columns may include the key size 516, encryption algorithm 518 and last modified timestamp 520. The key size 516 may include a number indicating the number of bits used for the storage key 112. The encryption algorithm may include an indicator of the encryption algorithm used to encrypt the storage construct 110. The last modified date 520 may comprise a timestamp indicating when the row 510 was last modified. The last modified date 520 may be used for analysis to determine the frequency with which the storage constructs 110 are being relocated or migrated. Other columns not illustrated may include the version number for the encryption algorithm, whether the storage key 112 is stored in an encrypted format, and the like.

Figure 6:
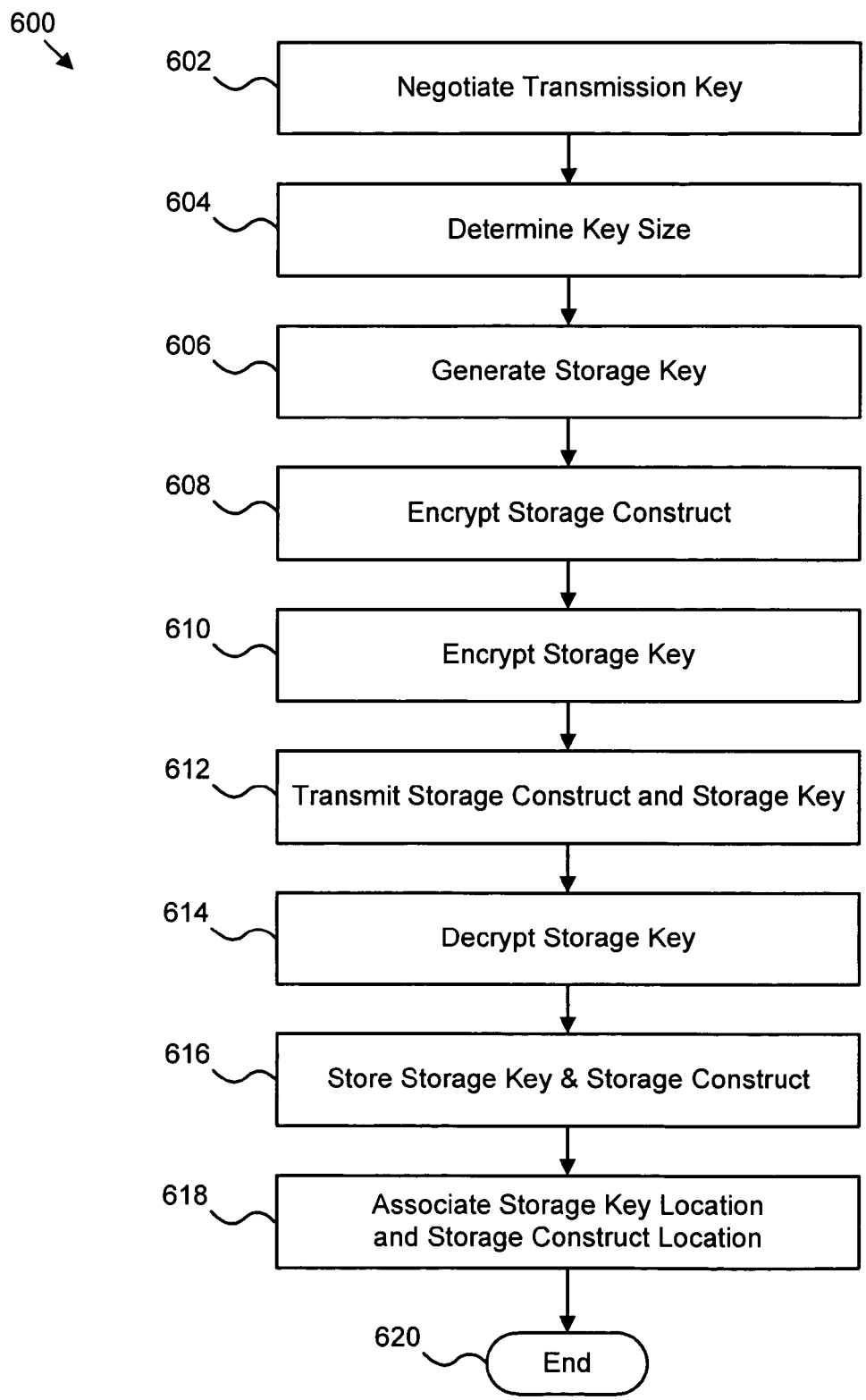
FIG. 6 is a schematic flow chart diagram illustrating a method for transparent end-to-end security of storage data in a client-server environment.

FIG. 6 illustrates a flow chart of a method 600 for transparent end-to-end security of storage data in a client-server environment. Preferably, the method 600 is implemented between a plurality of clients 102a-c and a server 104 of a storage management system. The method 600 begins when a client 102c requests storage services of the server 104. Specifically, the client 102c requests the server 104 to store a storage construct 110. Preferably, the client 102c and/or user of the client 102c are unaware that the storage construct 110 will be stored in an encrypted format with the multiple levels of security provided by the present invention.

Initially, as part of, or subsequent to establishing a communication session between the client 102c and the server 104, the negotiation module 210 of the client 102c communicates with the negotiation module 312 of the server 104 to negotiate 602 a transmission key 114. Preferably, the transmission key 114 may be renegotiated for each storage construct 110 transferred to the server 104.

Next, the key generator 202 may determine 604 the appropriate number of bits for the storage key 112. For example, the key generator 202 may reference a local security policy that defines the number of bits based on the type of storage construct 110. Of course other factors may weigh in on determining whether to encrypt the storage construct 110 and if so, how many bits to use for the storage key 112.

The key generator 202 then generates 606 preferably a random storage key 112. The encryption module 204 uses the storage key 112 to encrypt 608 the storage construct 110. The encryption module 204 encrypts 610 the storage key 112 using the transmission key 114. Next, the communication interface 206 transmits 612 the encrypted storage construct 110 and encrypted storage key 112 to the server 104.

The communication interface 302 of the server 104 receives the storage key 112 and storage construct 110. The security module 308 decrypts 614 the storage key 112 using the transmission key 114 that is shared with the client 102c. Next, storage module 304 stores the encrypted storage construct 110 on a first storage device 108b and the storage key 112 on a second storage device 112. The first storage device 108b may be a destination indicated by the client 102c. Alternatively, the storage device 304 selects the storage construct location 506. Preferably, the association module 306 determines the storage key location 508. In certain embodiments, the storage key location 508 is within the association 116. The association module 306 associates 618 the storage key location 508 and the storage construct location 506 then method 600 ends 620.

Managing an association 116 such that with identifying information of the storage construct 110 the associated storage key 112 can be readily located and provided to a client 102c along with the encrypted storage construct 110. The encryption module 204 can then decrypt the storage construct 110 with the storage key 112 and provide the decrypted storage construct 110 to the client 102c when needed. The association 116 may be modified as in response to move or copy operations of either the storage construct 110 or the storage key 112 or a name change to the storage construct 110.

Preferably, a process similar to that described above is used to retrieve a storage construct 110. Namely, the storage key 112 is encrypted using a transmission key 114. Once the client 102c receives the encrypted storage construct 110 and encrypted storage key 112, the client 102 decrypts the storage key 112 using the transmission key 114 and decrypts the storage construct 110 using the storage key 112.

Those of skill in the art will quickly recognize the potential benefits provided by the present invention. The ability of a storage management system to provide multiple levels of encryption protection that is controllable by the client 102c provides high security and flexibility. Furthermore, the association between the storage key and storage construct is tracked and modified as necessary on a construct by construct basis. Consequently, each storage construct 110 has a higher level of security and compromise of a storage key does not automatically comprise all storage constructs on a device. The storage key and storage constructs are also stored on separate physical devices such that a unauthorized physical access to one storage device does not automatically provide access to the storage constructs 110. Furthermore, the associations 116 may be stored on a third device to provide additional protection for the storage constructs 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

What is claimed is:

1. An apparatus for transparent end-to-end security of storage data in a client-server environment, the apparatus comprising:

a key generator that generates a random storage key for each storage construct associated with a storage session, the randomly generated storage key uniquely associated with one storage construct;

an encryption module that encrypts the storage construct according to a first encryption algorithm using the randomly generated storage key, the encryption module encrypting the randomly generated storage key using a transmission key and a second encryption algorithm known to a receiver;

a communication interface that transmits the encrypted storage construct and the encrypted randomly generated storage key to the receiver without transmitting the transmission key, the encrypted storage construct stored on the first storage device on the receiver without decrypting the encrypted storage construct, the storage construct remaining encrypted as long as the storage construct is stored on the receiver, the randomly generated storage key stored on a second storage device physically distinct from the first storage device;

a security module on the receiver that decrypts the encrypted randomly generated storage key using the transmission key, the security module re-encrypting the decrypted randomly generated storage key using a native key known exclusively to the receiver such that the randomly generated storage key stored on the second storage device is re-encrypted;

an association module associating the randomly generated storage key and the storage construct in a data construct comprising the randomly generated storage key, a storage construct name, a storage construct location, a randomly generated storage key location, a randomly generated storage key size, and an identifier for the first encryption algorithm;

the association module further receiving the storage construct name, and the storage construct location to identify the randomly generated storage key in a request for the storage construct from a client;

the security module decrypting the re-encrypted randomly generated storage key with the native key and re-encrypting the decrypted randomly generated storage key with a transmission key known to the client in response to the request for the storage construct from the client; and the encryption module key generator, communication interface, and security module comprise one or more of hardware and executable code, the executable code stored on one or more computer readable media.

2. The apparatus of claim 1, further comprising a negotiation module configured to negotiate the transmission key, the first encryption algorithm, and the second encryption algorithm between the sender and the receiver, wherein the negotiation module comprises one or more of hardware and executable code, the executable code stored on one or more computer readable media.

3. The apparatus of claim 1, wherein the storage construct comprises a file within a file system of the sender.

4. The apparatus of claim 1, further comprising a configuration module configured to define a symmetric transmission key identical to the transmission key used by the receiver, wherein the configuration module comprises one or more of hardware and executable code, the executable code stored on one or more computer readable media.

5. An apparatus for transparent end-to-end security of storage data in a client-server environment, the apparatus comprising:

a communication interface that receives an encrypted storage construct and an encrypted randomly generated storage key from a sender, the storage construct encrypted by the sender according to a first encryption algorithm using the randomly generated storage key randomly generated by the sender, the randomly generated storage key uniquely associated with one storage construct, the randomly generated storage key encrypted using a unique transmission key and a second encryption algorithm shared with the sender;

a negotiation module that generates the transmission key according to a preconfigured protocol, the preconfigured protocol comprising randomly generating a first half of the transmission key at a sending apparatus, randomly generating a second half of the transmission key at a receiver, communicating the first half of the transmission key with the receiver and communicating the second half of the transmission key with the sending apparatus, the first half of the transmission key and the second half of the transmission key comprising the transmission key such that the transmission key is known to both the sender and the receiver once the transmission key is generated;

a storage module that stores the encrypted storage construct without decrypting the encrypted storage construct, the encrypted storage construct stored on a first storage device, the storage module maintaining the encryption of the encrypted storage construct as long as the encrypted storage construct is stored on the first storage device, the storage module storing the randomly generated storage key on a second storage device physically distinct from the first storage device;

a security module on the receiver that decrypts the encrypted randomly generated storage key using the transmission key, the security module re-encrypting the decrypted randomly generated storage key using a native key known exclusively to the receiver such that the randomly generated storage key stored on the second storage device is re-encrypted:

an association module associating the randomly generated storage key and the storage construct in a data construct comprising the randomly generated storage key, a storage construct name, a storage construct location, a randomly generated storage key location, a randomly generated storage key size, and an identifier for the first encryption algorithm;

the association module further receiving the storage construct name, and the storage construct location to identify the randomly generated storage key in a request for the storage construct from the sender;

the security module decrypting the re-encrypted randomly generated storage key with the native key and re-encrypting the decrypted randomly generated storage key with a transmission key known to the sender in response to the request for the storage construct from the sender; and the communication interface, the negotiation module, the storage module, and the association module comprise one or more of hardware and executable code, the executable code stored on one or more computer readable media.

6. The apparatus of claim 5, wherein the transmission key is a symmetric encryption key suitable for use with symmetric encryption algorithms to encrypt and decrypt data.

7. A system for transparent end-to-end security of storage data in a client-server environment, the system comprising:

a plurality of backup-archive clients comprising a first user interface that receive a transmission key keyed into the first user interface, each client generating a unique randomly generated storage key for a specific storage construct, each client encrypting the storage construct according to a first encryption algorithm using the randomly generated storage key, each client encrypting the randomly generated storage key using the transmission key and a second encryption algorithm, wherein the storage construct comprises a physical file defined on a host of at least one of the backup-archive clients;

a storage server comprising a second user interface that receives an identical transmission key keyed into the second user interface, the storage server receiving the encrypted storage construct and the encrypted randomly generated storage key from one of the clients, the storage server storing the encrypted storage construct on a first storage device separate from a second storage device that stores the randomly generated storage key, the storage server maintaining the encryption of the encrypted storage construct as long as the encrypted storage construct is stored on the storage server;

a security module on the storage server that decrypts the encrypted randomly generated storage key using the transmission key, the security module re-encrypting the decrypted randomly generated storage key using a native key known exclusively to the storage server such that the randomly generated storage key stored on the second storage device is re-encrypted;

an association module associating the randomly generated storage key and the storage construct in a data construct comprising the randomly generated storage key, a storage construct name, a storage construct location, a randomly generated storage key location, a randomly generated storage key size, and an identifier for the first encryption algorithm;

the association module further receiving the storage construct name, and the storage construct location to identify the randomly generated storage key in a request for the storage construct from a client:

the security module decrypting the re-encrypted randomly generated storage key with the native key and re-encrypting the decrypted randomly generated storage key with a transmission key known to the client in response to the request for the storage construct from the client; and a network that operatively connects the backup-archive clients and the storage server for network communications without communicating the transmission key between the backup-archive clients and the storage server.

8. The system of claim 7, wherein the association module is further configured to modify the association in response to relocation of at least one of the randomly generated storage key and the encrypted storage construct.

9. The system of claim 7, wherein the association module comprises a relational database.

10. The system of claim 7, wherein the transmission key is a symmetric encryption key suitable for use with symmetric encryption algorithms to encrypt and decrypt data.

11. A computer readable storage medium tangibly embodying a program of machine-readable instructions executable by a digital processing apparatus to perform operations for transparent end-to-end security of storage data in a client-server environment, the operations comprising:

an operation to generate a unique randomly generated storage key for a specific storage construct;

an operation to encrypt the storage construct according to a first encryption algorithm using the randomly generated storage key;

an operation to encrypt the randomly generated storage key using a transmission key and a second encryption algorithm known to a sender and a receiver;

an operation to transmit the encrypted storage construct and the encrypted randomly generated storage key from the sender to the receiver without transmitting the transmission key from the sender to the receiver;

an operation to decrypt the randomly generated storage key using the transmission key;

an operation to store the encrypted storage construct on a first storage device and the randomly generated storage key on a second storage device physically distinct from the first storage device, the encryption of the storage construct maintained as long as the storage construct is stored on the first storage device;

an operation to associate the randomly generated storage key and the storage construct in a data construct comprising the randomly generated storage key, a storage construct name, a storage construct location, a randomly generated storage key location. a randomly generated storage key size, and an identifier for the first encryption algorithm;

an operation to receive the storage construct name, and the storage construct location to identify the randomly generated storage key in a request for the storage construct from a client;

an operation for re-encrypting the decrypted randomly generated storage key using a native key known exclusively to the receiver such that the randomly generated storage key stored on the second storage device is re-encrypted; and an operation for decrypting the re-encrypted randomly generated storage key with the native key and re-encrypting the decrypted randomly generated storage key with a second transmission key known to the client in response to the request for the storage construct from the client.

12. The computer readable storage medium of claim 11, further comprising an operation to modify the association that comprises the randomly generated storage key location and the storage construct location in response to changing the location of at least one of the randomly generated storage key and the encrypted storage construct.

13. The computer readable storage medium of claim 11, wherein the storage construct comprises a file within a file system of the sender.

14. The computer readable storage medium of claim 11, further comprising an operation to configure the sender and the receiver with an identical symmetric transmission key.

15. The computer readable storage medium of claim 11, further comprising an operation to determine at least one of the randomly generated storage key size and the first encryption algorithm based on a security policy associated with the storage construct.

16. The computer readable storage medium of claim 15, wherein the sender determines the randomly generated storage key size based on a local security policy.

17. The computer readable storage medium of claim 11, wherein the sender generates the randomly generated storage key based at least in part on data associated with the storage construct.

18. The computer readable storage medium of claim 11, wherein at least one of the first storage device and the second storage device comprises a removable computer-readable medium.

19. The computer readable storage medium of claim 11, further comprising, an operation to transmit the encrypted randomly generated storage key and encrypted storage construct to the client, wherein the second transmission key and the transmission key are different keys;

an operation to decrypt the randomly generated storage key using the second transmission key at the client; and an operation to decrypt the storage construct using the decrypted randomly generated storage key and store the decrypted storage construct on the client without user interaction.

20. A method for deploying computing infrastructure, comprising integrating computer readable code tangibly embodied on a computer readable storage medium into a computing system, wherein the code in combination with the computing system is capable of performing the following:

randomly generating a unique storage key for a specific storage construct;

encrypting the storage construct according to an first encryption algorithm using the randomly generated storage key;

encrypting the randomly generated storage key using a transmission key and a second encryption algorithm known to a sender and a receiver;

transmitting the encrypted storage construct and the encrypted randomly generated storage key from the sender to the receiver without transmitting the transmission key;

decrypting the randomly generated storage key using the transmission key;

re-encrypting the randomly generated storage key using a native key known exclusively to the receiver;

storing the encrypted storage construct on a first storage device and maintaining the encryption of the storage construct as long as the storage construct is stored on the first storage device, and storing the re-encrypted randomly generated storage key on a second storage device physically distinct from the first storage device; and associating the randomly generated storage key and the storage construct in a data construct comprising the randomly generated storage key, a storage construct name, a storage construct location, a randomly generated storage key location, a randomly generated storage key size, and an identifier for the first encryption algorithm;

receiving the storage construct name, and the storage construct location to identify the randomly generated storage key in a request for the storage construct from a client;

decrypting the re-encrypted randomly generated storage key using the native key and re-encrypting the storage key with a transmission key known to the client in response to the request for the storage construct from the client.

21. The method of claim 20, further comprising modifying the association that defines the randomly generated storage key location and the storage construct location in response to changing the location of at least one of the randomly generated storage key and the encrypted storage construct.

22. An apparatus for transparent end-to-end security of storage data in a client-server environment, the apparatus comprising:

means for randomly generating a unique storage key for a specific storage construct;

means for encrypting the storage construct according to a first encryption algorithm using the randomly generated storage key;

means for encrypting the randomly generated storage key using a transmission key and a second encryption algorithm known to a sender and a receiver;

means for transmitting the encrypted storage construct and the encrypted randomly generated storage key from the sender to the receiver without transmitting the transmission key from the sender to the receiver;

means for decrypting the randomly generated storage key using the transmission key;

means for re-encrypting the randomly generated storage key using a native key known exclusively to the receiver;

means for storing the encrypted storage construct on a first storage device, the encryption of the storage construct maintained as long as the storage construct is stored on the first storage device;

means for associating the randomly generated storage key and the storage construct in a data construct comprising the randomly generated storage key, a storage construct name, a storage construct location, a randomly generated storage key location, a randomly generated storage key size, and an identifier for the first encryption algorithm;

means for receiving the storage construct name, and the storage construct location to identify the randomly generated storage key in a request for the storage construct from the sender:

means for storing the re-encrypted randomly generated storage key on a second storage device physically distinct from the first storage device; and means for decrypting the re-encrypted randomly generated storage using the native key and re-encrypting the decrypted randomly generated storage key with a transmission key known to the sender in response to the request for the storage construct from the sender.

* * * * *